June 24, 1941. P. PELLEGRINI 2,246,985
FOLDABLE STEP
Filed Aug. 17, 1938 2 Sheets-Sheet 1
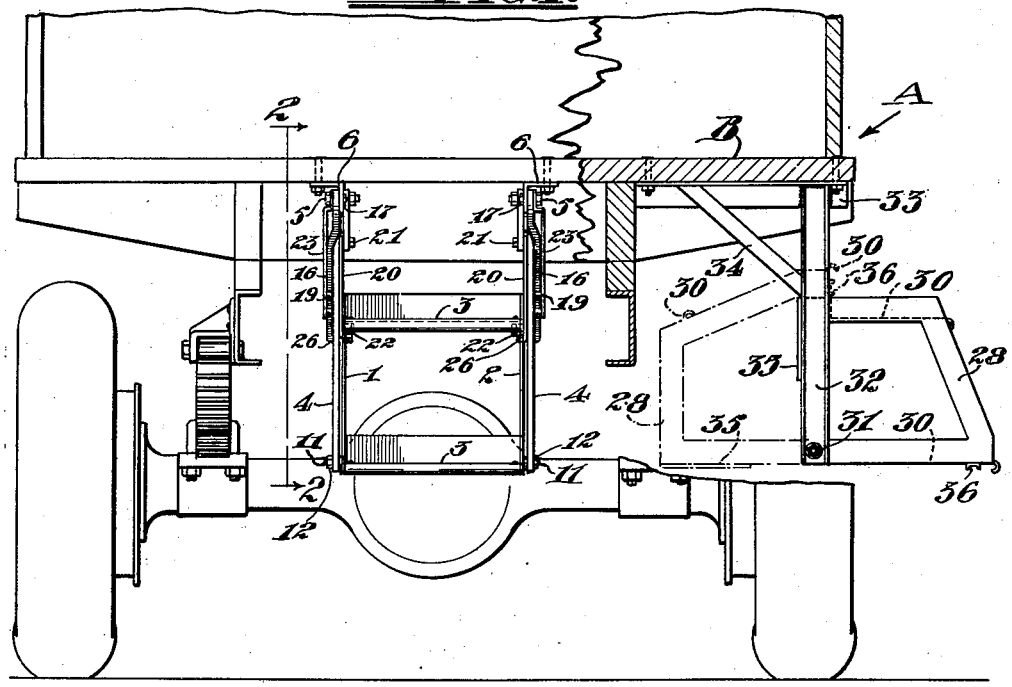
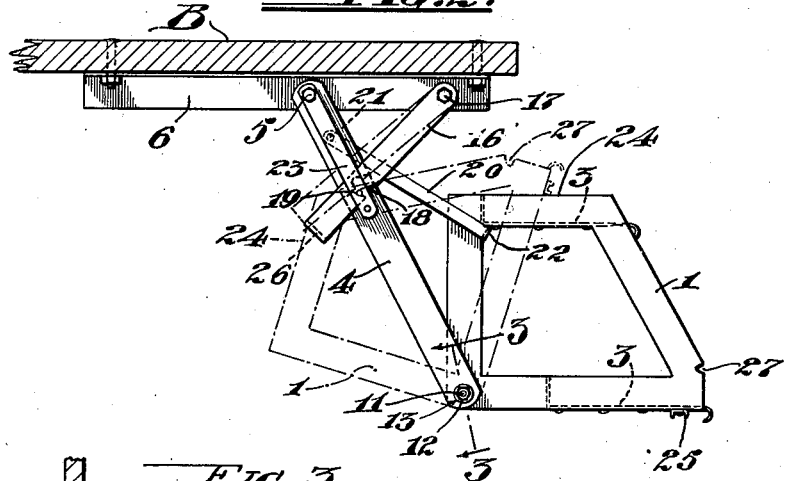
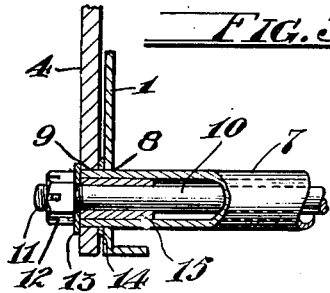
Inventor
Phillip Pellegrini
By
Attorney June 24, 1941.   P. PELLEGRINI   2,246,985
FOLDABLE STEP
Filed Aug. 17, 1938    2 Sheets-Sheet 2
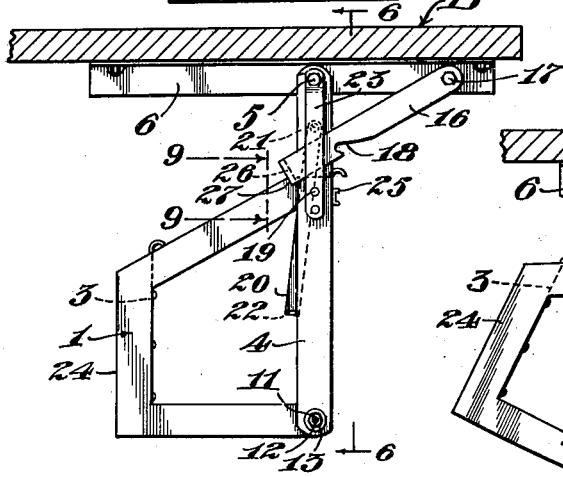
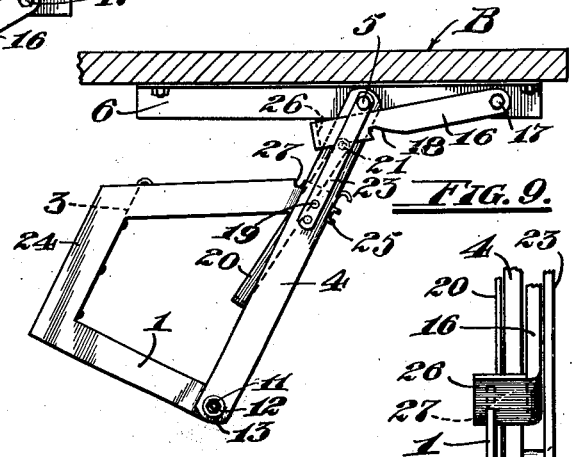
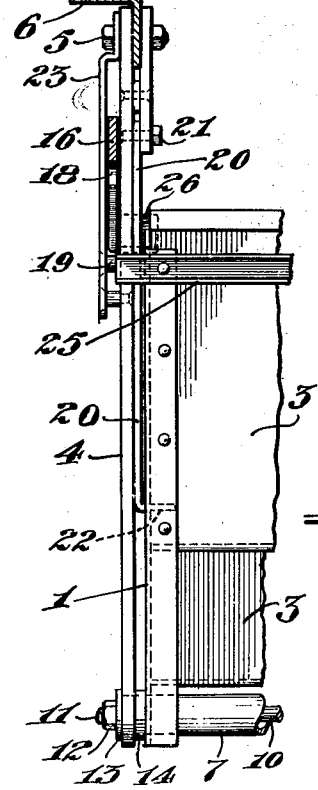
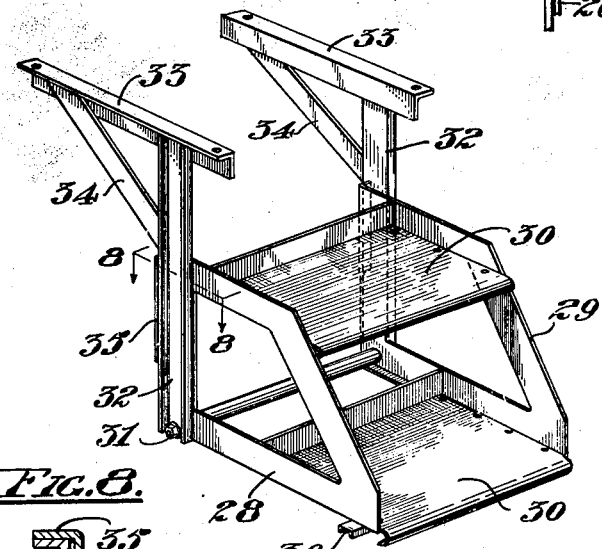
Inventor
Phillip Pellegrini
By
Attorney Patented June 24, 1941

2,246,985

UNITED STATES PATENT OFFICE 2,246,985

FOLDABLE STEP

Phillip Pellegrini, Glendale, Calif., assignor to Virgil McCombs, Los Angeles, Calif.

Application August 17, 1938, Serial No. 225,317

13 Claims. (Cl. 280—166)

The present invention relates to and has for an object the provision of a step unit for facilitating climbing onto, as well as ready access to, the bed or loading floor of a truck or other vehicle, from a side or end thereof, said unit being constructed and arranged so that it may be readily installed on a vehicle for movement at will from an out-of-the-way position lying under the floor of the vehicle, into position of use extending outwardly from said floor and vice versa, and when extended, providing one or more conveniently placed steps which will permit the operator to climb from the ground onto the vehicle in loading and unloading the latter.

Another object of this invention is to provide a foldable step unit of the character described which may be used for the purpose of facilitating climbing onto elevated platforms or other ordinarily inaccessible places, and for other purposes, and is constructed and arranged whereby it will be gravitationally maintained against unintentional movement out of its positions of use and non-use.

Another object of this invention is to provide a foldable step of the character described which, when disposed in out-of-the-way position beneath the floor of the vehicle to which it is attached, will swing freely inwardly and thereby be protected against injury or derangement, should the device encounter an obstruction such as a loading platform or the like which may extend under the body of the vehicle when the latter is being maneuvered to a loading or unloading position.

A further object of this invention is to provide a step of the character described which will be automatically locked against unintentional movement out of positions of use and non-use and may be released upon being intentionally moved in a predetermined manner by the operator.

I have shown a preferred form of foldable step in the accompanying drawings, embodying my invention, subject however, to modification within the scope of the appended claims, without departing from the spirit of my invention.

Referring to the drawings:

Fig. 1 represents a fragmentary rear elevation partly in section, of a motor vehicle as when equipped with step units made in accordance with my invention and applied to an end and one side of such vehicle;

Fig. 2 represents a fragmentary sectional view taken on the plane of line 2—2 of Fig. 1, and showing in side elevation one of the step units of my invention as extended for use;

Fig. 3 represents an enlarged detail section taken on the plane of line 3—3 of Fig. 2;

Fig. 4 represents a side elevation of the step unit as when in folded or out-of-the-way position;

Fig. 5 is a view similar to Fig. 4 but showing the step and associated parts in the position assumed when encountering an obstruction;

Fig. 6 is an enlarged sectional view taken on the plane of line 6—6 of Fig. 4;

Fig. 7 is a perspective view of a variational form of step as when extended;

Fig. 8 is a sectional view taken on the plane of line 8—8 of Fig. 7;

Fig. 9 is a sectional view taken on the plane of line 9—9 of Fig. 4.

Referring to the invention as disclosed in detail in the accompanying drawings, it is seen that the step unit thereof comprises a frame structure made up of upright side members 1 and 2 which are joined by one or more step tread members 3 so as to provide a skeleton structure wherein the frame members 1 and 2 are substantially rectangular and open, and the treads are formed as plates which may be riveted, welded or otherwise secured to said frames whereby to form a light but strong structure. In accordance with this invention provision is made for supporting the step unit for pivotal movement into and out of position of use, as for example, upon a truck or other vehicle A, to facilitate climbing onto the floor B thereof, or for gaining access to other elevated platforms and the like not shown, and preferably the means for so supporting said step unit is constructed so that the latter is pivoted at one lower corner thereof and may be swung so as to be gravitationally maintained in positions of use and non-use.

One form of this invention, which is particularly adapted for application to the rear end of a truck or like vehicle for movement from an out-of-the-way position lying beneath the floor of the vehicle into position extending outwardly beyond said floor, includes the step unit as hereinbefore described, supported by and between a pair of bars or like members 4, the upright ends of which are adapted to be pivoted to the vehicle beneath the floor thereof, whereas the lower ends thereof are pivoted to the frames 1 and 2 of the step unit. As here shown the upper ends of the bars 4 are pivoted as at 5 to angle bars 6 which are in turn secured to the floor of the vehicle in any suitable way, but any other suitable means may be used for pivotally connecting the step device with the vehicle.

The bars 4 are pivotally connected with the step unit by means of a tubular member 7 extended between the frame members 1 and 2 and thru openings 8 in the lower corners of said frame members and also thru similar openings 9 in the lower ends of the bars 4. A bolt 10 is extended thru the tubular member 7 and has threaded ends 11 extended outwardly beyond the bars 4 so that nuts 12 and washers 13 may be mounted thereon for securing the pivot members in place. It is noted that the washers 13 engage the outer ends of the tubular member 7 and similar washers 14 are mounted upon the tubular member between the frame members 1 and 2 and bars 4. This provides for a free pivotal movement of the step unit and said bars without frictional binding thereof. Tubular bearing inserts 15 are mounted in the ends of the tubular member 7 for supporting the bolt 10. With this arrangement the pivot means materially strengthens and reinforces the step unit.

Latch bars or members 16 are pivoted as at 17 to and depend from the angle bars 6 so that notches 18 in said latch bars will receive pins 19 carried by the hanger bars 4 whereby the latter may be maintained as shown in Fig. 2, in position for supporting the step unit extended for use. To prevent the step unit from tilting out of its position of use, as shown in Fig. 2, auxiliary hanger bars 20 are pivoted as at 21 to the inner sides of the bars 4 and extend downwardly and forwardly so that the right angularly extended free ends 22 thereof will hook within the openings of the frames 1 and 2. In order to maintain the hanger bars 4 and latch bars 16 in operative relation, guide members 23 are fixed at their ends to the outer sides of the bars 4 so as to be spaced outwardly from the latter, whereby the latch bars 16 may slide freely between bars 4 and members 23. It will now be seen that with the step in the position shown in Fig. 2 the operator may climb onto the body of the truck from the ground or stand upon the step unit for gaining access to the floor of the truck without having to climb on the tires or otherwise use makeshift means for climbing onto the truck.

To move the step from position of use into position of non-use the operator may tilt the step upwardly and rearwardly on its pivotal connection with the bars 4 and when the step unit is moved past center, it will then gravitate into an out-of-the-way position. During the upward and rearward movement of the unit, the edges 24 of the frames 1 and 2 will engage and lift the right angularly extended ends 26 of the latch bars 16 so that the notches 18 in the latter will clear the pins 19, as shown in dotted lines in Fig. 2, whereupon the entire structure, that is, the bars 4 and step unit, will then gravitate into the out-of-the-way position shown in Fig. 4. Stop members 25 on the step unit engage the bars 4 to limit the movement of said unit to the position thereof shown in Fig. 4. The ends 26 on said bars 16 act as stops for the bars 4 and also engage in notches 27 in the frames 1 and 2 whereby to lock the step unit against being accidentally tilted forwardly into position of use. It is thus seen that but a quick upward thrust or movement of the step unit on its pivotal mounting is all that is necessary to cause the entire device to be disposed in out-of-the-way position and to be automatically locked in such position as shown in Fig. 4.

In this out-of-the-way position, altho the device as a whole is disposed in inwardly spaced relation to the rear end of the floor of the truck and should the truck be driven over a projection such as a loading platform and the latter encounter the device, said device will swing freely inwardly into position shown in Fig. 4, the ends 26 of latch bars 16 being forced by cam action out of the notches 27 and the bars 16 being moved upwardly by sliding contact of said ends 26 with the rear edges of the bars 4 as the latter swing inwardly, as aforesaid.

In order to move the step unit into position of use from position of non-use the operator grasps the step unit and moves the same slightly inwardly so that the ends 26 of the bars 16 will move out of the notches 27, and then quickly swings the unit outwardly before ends 26 move into latching position, and finally turns the step unit into position shown in Fig. 2, the auxiliary hangers 20 holding the step unit against swinging downwardly out of operative position and the latching bars 16 holding the hanger bars 4 in forwardly and rearwardly inclined position, as shown in Fig. 2.

Referring to the form of the invention shown in Fig. 7 and the right side of Fig. 1, wherein said form of the invention is shown applied to a side of the truck, it is seen that the step unit comprises open and substantially rectangular side frames 28 and 29 joined by tread portions 30 in the same manner as in the step unit previously described. The frames 28 and 29 are pivoted as at 31 to the lower ends of stationary hanger bars 32 which are secured to and depend from angular bars 33. The bars 33 are adapted to be bolted or otherwise secured to the vehicle, as shown in Fig. 1, so that the step unit may be moved into position beneath the vehicle floor or extended outwardly therefrom. Brace members 34 may be employed for strengthening the frame structure comprising the bars 32 and 33. As here shown the step unit is pivoted to the bars 32 by the same means as used in the step unit of the previously described form of the invention and like said other form, is arranged so that it will be gravitationally maintained in both positions. Stop flanges 35 are provided on the frames 28 and 29 for engaging the bars 32 to limit the movement of the step unit into the operative position, as shown in Fig. 7. This unit is also limited as to movement into retracted position by stop members 36 which may be provided by securing a bar to extend transversely between and also outwardly from the frames 28 and 29. This form of the invention is particularly adapted for application to the sides of a truck and may be readily and easily moved into and out of positions of use and when in either of such positions, will be gravitationally maintained against unintentional movement.

It will now be seen that I have provided a step device which, although primarily adapted for use on trucks and the like, may be put to other uses and may also be used as a seat instead of a step, as for example, in a theater, or may be used as a support for scaffolding or any other purpose wherein a step-like structure consisting of the side frames and seat or tread members extended therebetween, is pivoted on a support so that it may be swung into and out of positions of use, in accordance with this invention.

I claim:

1. A step for facilitating climbing onto the loading floor of a truck or other vehicle from a side or end of the vehicle, comprising a step tread, and means providing for connecting said tread with a vehicle beneath its floor and for the swinging of said tread from position of non-use lying inwardly spaced from a side or end margin of said floor into position of use as a step lying outwardly spaced from said margin and vice versa, said means and said tread being adapted to swing freely inwardly from position of non-use, upon encountering an obstruction such as a loading platform which may extend under the floor of the vehicle.

2. A step for facilitating climbing onto the floor of a truck or other vehicle from a side or end of the vehicle, comprising a frame, a step tread on said frame, means adapted to be attached to the vehicle beneath the floor thereof for pivotally supporting the frame for movement from an out-of-the-way position wherein the tread and frame are spaced inwardly of a margin of said floor into a position of use wherein the tread is extended outwardly from said margin, and vice versa, said frame and the supporting means therefor being arranged whereby the force of gravity maintains the frame and step in both positions thereof, and means automatically locking said frame against unintentional movement when said frame is moved into said two positions and automatically releasing said frame incident to predetermined intentional movements thereof and also releasing said frame, should the latter, the supporting means or the tread, when in out-of-the-way position, encounter an obstruction such as a loading platform, which may extend under said floor, said frame and the supporting means being arranged to swing freely inwardly when encountering an obstruction as aforesaid.

3. A step for facilitating climbing onto the floor of a truck or other vehicle, from a side or end thereof, comprising a frame, a step tread thereon, frame supporting members, means for pivotally connecting the upper ends of said members with a vehicle beneath the floor of the latter, means for pivotally connecting said members to opposite sides of lower portions of said frame to provide for movement of said frame from position of non-use lying beneath said floor into position of use extending outwardly as a step, and vice versa, latch members for holding said frame supporting members in inclined position when said frame is in extended position, portions on said frame for engaging and releasing said latch members upon swinging of said frame into position of non-use, and stop members on said frame for engaging said supporting members to limit the movement of said frame relative to said supporting members.

4. A step for facilitating climbing onto the floor of a truck or other vehicle, from a side or end thereof, comprising a frame, a step tread thereon, frame supporting members, means for pivotally connecting the upper ends of said members with a vehicle beneath the floor of the latter, means for pivotally connecting said members to opposite sides of lower portions of said frame to provide for movement of said frame from position of non-use lying beneath said floor into position of use extending outwardly as a step, and vice versa, latch members for holding said frame supporting members in inclined position when said frame is in extended position, portions on said frame for engaging and releasing said latch members upon swinging of said frame into position of non-use, and stop members on said frame for engaging said supporting members to limit the movement of said frame relative to said supporting members, and cooperating latch elements on said frame and latch members for releasably holding said frame against unintentional movement out of its retracted position.

5. A step comprising a frame including a step tread, frame supporting bars pivoted at their lower ends to a lower portion of said frame, supporting means to which the upper ends of said supporting bars are pivoted, latch members adapted to be pivoted on said supporting means and having notches therein, projections on said supporting bars adapted to engage in said notches, other bars pivoted on said supporting bars and having terminals adapted to engage said frames for holding the same in extended positions.

6. A step comprising a frame including a step tread, frame supporting bars pivoted at their lower ends to a lower portion of said frame, supporting means to which the upper ends of said supporting bars are pivoted, latch members adapted to be pivoted on said supporting means and having notches therein, projections on said supporting bars adapted to engage in said notches, other bars pivoted on said supporting bars and having terminals adapted to engage said frames for holding the same in extended positions, portions on said frame adapted to engage and move said latch members out of latching position upon movement of said frame from position of use to position of non-use.

7. A step device comprising a frame, a step tread thereon, supporting bars, supporting means for pivotally suspending said bars, means for pivotally connecting said bars to opposite sides of said frame adjacent the lower side of the latter, to provide for a movement of said frame into and out of positions for use of the tread as a step, auxiliary supporting bars pivoted on said first named supporting bars and having portions for engaging and limiting the movement of said frame to a position presenting the tread for use as a step, latch members pivoted to and depending from said supporting means and having notches therein, projections on said first named supporting bars adapted to engage in said notches for holding said supporting bars in inclined position when the frame is extended, said frame having notches therein and portions on said latch members adapted to engage in the notches in said frame for releasably holding the frame in retracted position, portions on said frame arranged to engage and move said latch members out of latching position when the frame is turned on its pivots into its retracted position, and stop members on said frame adapted to engage the first named supporting bars for limiting the swinging movement of said frame relative thereto.

8. A step for trucks and other vehicles including a step structure, supporting arms, means for pivotally connecting said arms to a truck body so as to depend therefrom, means for pivotally connecting said arms with said step structure to provide for movement of said structure from the position of non-use lying beneath the truck into position of use extending outwardly from said truck and vice versa, latch members for holding said arms in position to present the step structure for use, portions on said structure for engaging and releasing said latch members upon the swinging of said step structure into position of non-use whereby said arms and said structure may be swung inwardly beneath the truck, other latch means operating automatically upon predetermined inward swinging of said arms and said structure to hold the step structure against pivotal movement relative to said arms.

9. A step for trucks and other vehicles including a step structure, supporting arms pivotally attached to and depending from a truck body, and also pivotally connected with said step structure so as to provide for movement of said structure from out-of-the-way position lying beneath the truck into position of use extending outwardly from the truck and vice versa, latch bars pivotally attached to and depending from said truck body and cooperating means on said bars and arms for locking said structure in a predetermined position.

10. A step for trucks and other vehicles including a step structure, supporting arms pivotally connected with and depending from the truck body and also pivotally connected at their free ends with said step structure, and means for automatically locking said arms and step structure against undesired movement when the step structure is in an out-of-the-way position as well as when in position of use, said means including elements connecting said body and said arms and said arms and said step structure.

11. In combination, a platform, step supporting arms mounted on and adapted to swing back and forth beneath said platform, a step structure pivotally mounted on said arms for bodily swinging movement therewith and pivotal movement relative thereto, said step structure including vertically disposed side frames and treads secured one above the other to and between said frames; and means for holding said step supporting arms in position and to maintain the step structure in operative position, including members pivoted on said platform and engaging said arms when the step structure is in position of use and disengaging from said arms when the step structure is swung into a predetermined position on its pivotal connections with said arms.

12. In combination, a platform, step supporting arms mounted on and adapted to swing back and forth beneath said platform, a step structure pivotally mounted on said arms for bodily swinging movement therewith and pivotal movement relative thereto, and means for holding said step supporting arms in position and to maintain the step structure in operative position, including members pivoted on said platform and engaging said arms when the step structure is in position of use and disengaging from said arms when the step structure is swung into a predetermined position on its pivotal connections wth said arms.

13. A vehicle step including: a frame having a tread, coplanar arms pivotally attached at their upper ends to the vehicle body and pivotally connected at their lower ends to said frame, a latch arm pivotally attached to and depending from the vehicle body and provided with means engageable with means on said arms for holding said frame retracted to and in inoperative position, and means pivotally attached to at least one of said arms and engageable with a portion of said frame for supporting said tread in operative position.

PHILLIP PELLEGRINI.